United States Patent [19]

Reznek et al.

[11] Patent Number: 5,147,630
[45] Date of Patent: Sep. 15, 1992

[54] METHOD OF PRODUCING ALUMINA FOAMS

[76] Inventors: Steven R. Reznek, 20 Garden Rd., Wellesley, Mass. 02181; Bruce E. MacKay, 1 Summer St., Framingham, Mass. 01701

[21] Appl. No.: 361,549

[22] Filed: Jun. 5, 1989

[51] Int. Cl.$^5$ .............................................. C01F 7/04
[52] U.S. Cl. ................................... 423/625; 423/628
[58] Field of Search ............... 423/266, 275, 592, 608, 423/609, 610, 611, 612, 613, 615, 631, 614, 593, 625, 628; 252/307, 309, 350; 156/77; 55/87

[56] References Cited

U.S. PATENT DOCUMENTS

| | | | |
|---|---|---|---|
| 3,161,468 | 12/1964 | Walsh | 423/335 |
| 3,172,753 | 3/1965 | Walsh | 75/29 |
| 3,273,962 | 9/1966 | Walsh | 423/627 |
| 3,961,036 | 6/1976 | Hammer et al. | 423/628 |
| 4,018,881 | 4/1977 | Mattox | 423/631 |
| 4,048,290 | 9/1977 | Lee | 423/608 |
| 4,179,408 | 12/1979 | Sanchez et al. | 423/628 |
| 4,292,290 | 9/1981 | Tunison, III | 423/592 |
| 4,331,645 | 5/1982 | Dunn, Jr. | 423/625 |
| 4,729,890 | 3/1988 | Stacey et al. | 423/625 |
| 4,755,373 | 7/1988 | Gherardi et al. | 423/592 |
| 4,902,494 | 2/1990 | Montino et al. | 423/625 |

FOREIGN PATENT DOCUMENTS 58-176127 10/1983 Japan.
59-227724 12/1984 Japan.
60-16819 1/1985 Japan.
60-131826 7/1985 Japan.

OTHER PUBLICATIONS

Chem. Abstract. 104:17798r.
Chem. Abstract 10072954V.
Derwent Abstract 85-207313/34.
Derwent Abstract 83-823964/47.
"Synthesis of Alumina . . . ", Ciminelli (1983).
"Ultrafine Metal Oxides by Decomposition of Salts in a Flame", Electrochemical Soc. Series (1963).

Primary Examiner—Melvyn J. Andrews
Attorney, Agent, or Firm—David J. Koris; Harry J. Gwinwell

[57] ABSTRACT

The present invention relates to alumina oxide particles having an internal foam structure and a method of making the same. The method first creates foam particles of aluminum sulfate and, subsequently, converts the aluminum sulfate to aluminum oxide particles with the same internal foam structure. The aluminum oxide foam particles made by this method have large specific surface areas and pore volumes.

10 Claims, 3 Drawing Sheets

2.5 MICRONS

FOAMED ALUMINUM SULFATE 2.5 MICRONS

FOAMED ALUMINUM OXIDE

METHOD OF PRODUCING ALUMINA FOAMS

FIELD OF INVENTION

The present invention relates to alumina particles and, more particularly, relates to alumina foam particles and a method of making the same.

BACKGROUND OF THE INVENTION

High surface aluminum oxide particles are well known in the art. Conventionally they are precipitated from either a liquid or a gas phase. In the usual liquid phase embodiments, the acidity, temperature or concentration of the aluminum salt solution is varied to precipitate the alumina oxide or hydroxide. Alternatively an organic aluminum or aluminum oxide complex, such as an alkoxide, is hydrated to precipitate the inorganic oxide or hydroxide. In the usual gaseous phase embodiment an aluminum compound is evaporated and then hydrolyzed by steam or oxygen to precipitate the metal oxide. Representative of that prior art method is the formation of fumed alumina from vaporized aluminum chloride. In both the usual liquid and gas phase precipitations the particles formed can be quite fine and have quite large specific surface areas; however, these powders do not possess an internal foam structure.

The decomposition or hydrolysis of metal salts in high temperature gas streams is common in the art. In the usual approach, known as the spray dryer technique, a slurry or solution of a decomposable salt is atomized into a gas. The particles so formed can be relatively large, hollow spheres. The spheres often contain holes where the residual water or decomposition gases have escaped from the interior of the particle. The hollow spheres formed under these conditions do not have high specific surface areas.

A method for high temperature hydrolysis of a metal salt solution is disclosed by Walsh in U.S. Pat. No. 3,273,962 and in an article entitled, "Ultrafine Metal Oxides By Decomposition of Salts in a Flame," *Ultrafine Particles* (Wiley & Sons, 1963). In this method, a two fluid atomizing nozzle is used to form a plume of solution droplets. This plume may contain, or is subsequently combined with, the fuel and oxidizing gas for a flame. Subsequent to creation of the droplets, a pilot flame initiates combustion. When combustion occurs, the fuel gases are burned to provide heat and thus permit decomposition of the metal salts. Walsh discloses a one-step method for making alumina particles from aluminum sulfate solutions. However, the resulting product is a plate like or laminar structure with a surface area of 33 $M^2$/gm. Walsh does not teach the formation of foamed alumina from aluminum sulfate solutions.

A Pennsylvania State University thesis by Renato Ciminelli entitled "Synthesis of Alumina from Al(NO$_3$)$_3$ 9H$_2$O by the Evaporative Decomposition of the Solution Process" discloses the decomposition of aluminum nitrate in a high temperature atmosphere. Ciminelli uses an atomizing nozzle to spray aluminum nitrate solution into a furnace heated ceramic tube. Ciminelli found that aluminum nitrate droplets converted to aluminum oxide particles, with a hollow sphere or foam structure, when the temperature of the outside of the ceramic tube, midway along its length, was in a range from 700° C. to 1000° C. Under these conditions, Ciminelli was unable to make alumina particles with surface area greater than 43 square meters per gram. Ciminelli also calcined the particles made in his apparatus. By further heat treating the alumina particles at 950° C. he was subsequently able to raise their surface area to 77 square meters per gram.

SUMMARY OF THE INVENTION

The present invention includes aluminum oxide foam particles and a method of making the same. A solution of aluminum sulfate is atomized and heated to remove the free water and the water of hydration. Since the hydrated aluminum sulfate is a viscous liquid at elevated temperatures, the evolution of the water creates a foaming action. Aluminum sulfate is stable up to fairly high temperatures. As long as the temperature is low enough the foam will be aluminum sulfate. The foamed particles of sulfate can be collected from the hot dehydrating gas by methods known in the art, e.g. bag houses, cyclones, etc. The foam particles of aluminum sulfate can be converted to alumina by heating. The alumina foam particles rendered thereby have large specific surface areas and pore volumes.

Accordingly, it is a primary object of the present invention to provide a high temperature process for forming aluminum oxide foam particles with high surface areas and high void volumes.

It is another object of the present invention to provide a highly porous aluminum oxide foam particle.

DESCRIPTION OF THE INVENTION

Figure 1:
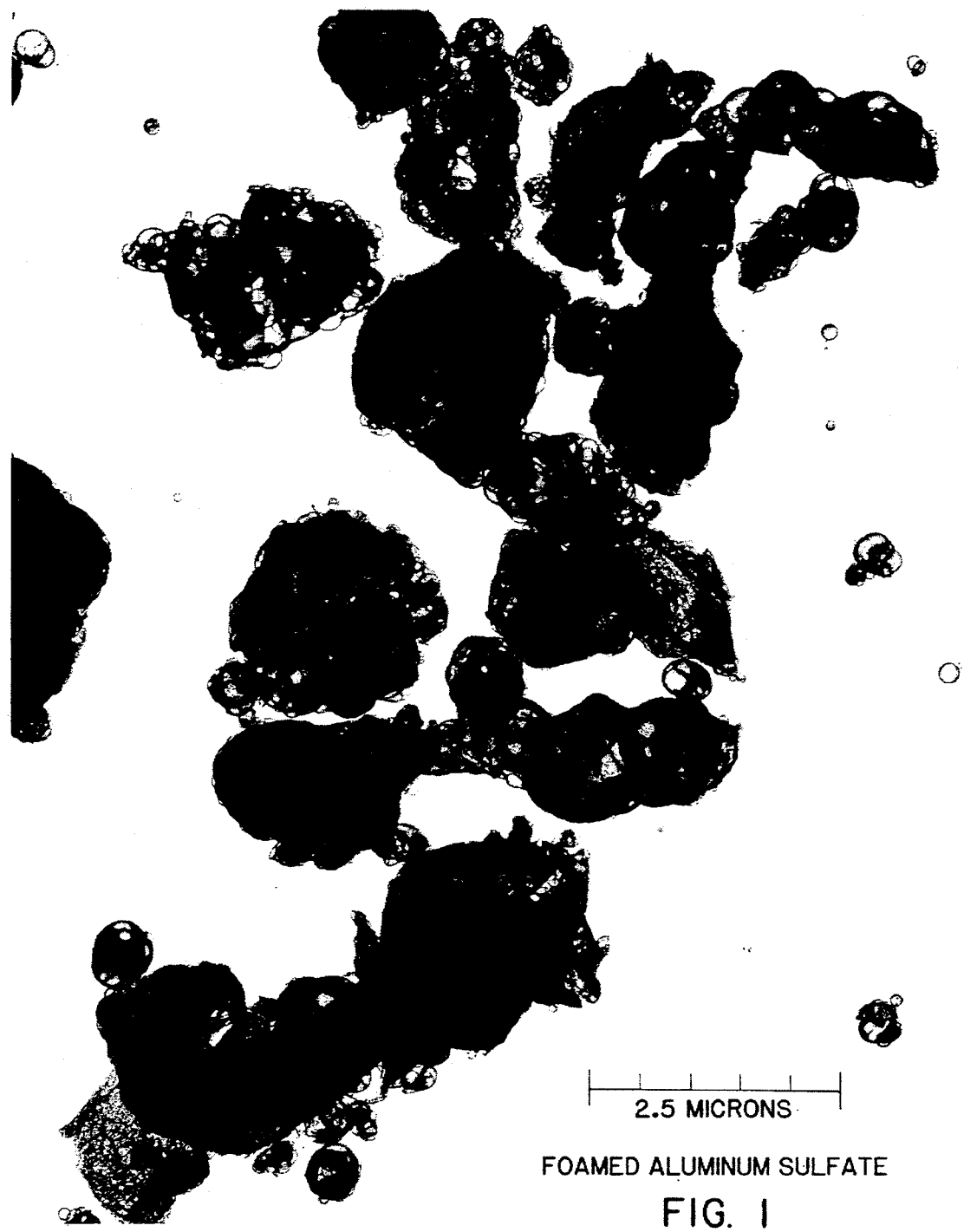
FIG. 1 is a TEM of a foam particle of aluminum sulfate.
Figure 2:
FIG. 2 is a TEM of a foam particle of alumina oxide.

FIGS. 1 and 2 are transmission electron micrographs of foamed particles of aluminum sulfate and alumina. The individual foam particles can be as small as 0.1 microns or as large as 50 microns. These metal oxide particles have a high specific surface area and consist of thin walls bounding hollow cells or pores. The walls can be as thin as fifty angstroms; but more commonly are around 100 to 200 angstroms. The typical dimension of the pore or cell is 0.1 microns, but many range from 0.01 micron to 2.0 microns. A typical particle will contain many such cells. A minority of the foam particles may be single hollow spheres. The high specific surface area and high pore volume particles of the present invention are useful in a number of applications, including catalyst supports, abrasives and absorbents.

Figure 3:
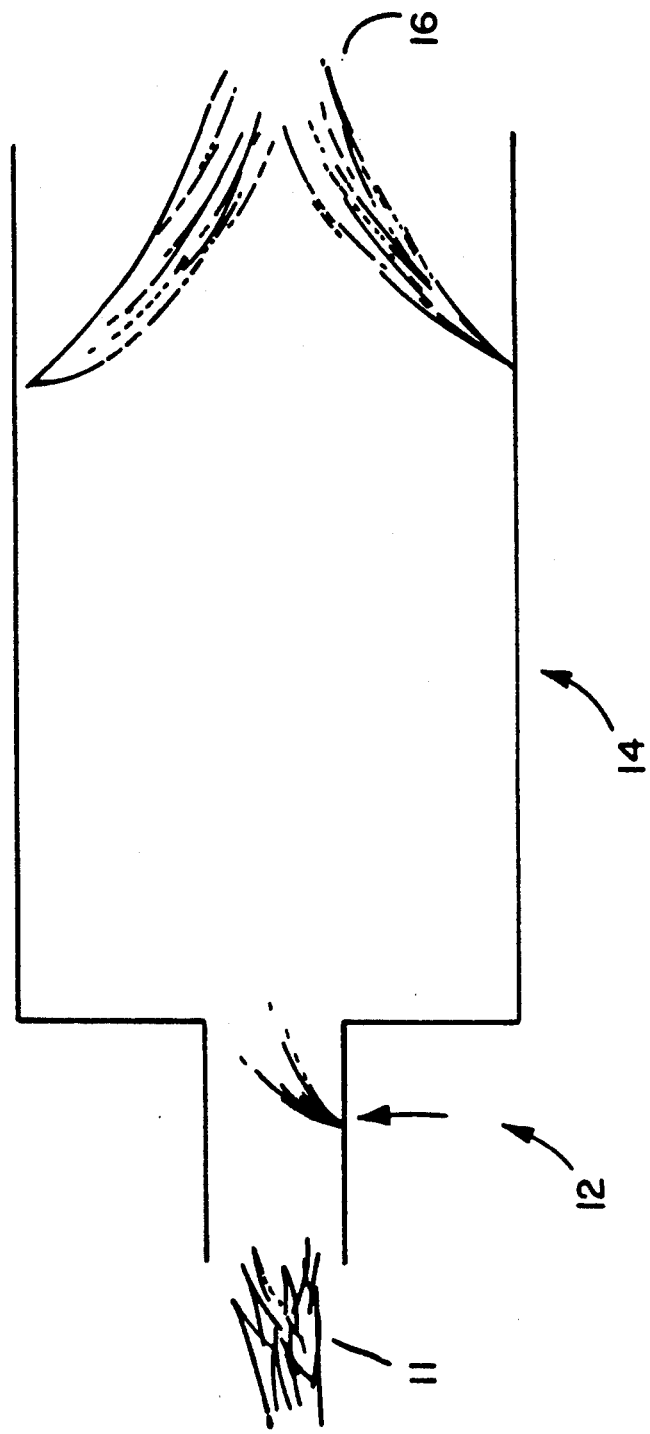
FIG. 3 is a schematic view of a method of forming foamed particles of aluminum sulfate according to the preferred embodiment of the inventor.

The present invention of making high surface area, high pore volume foam particles comprises the steps of forming foamed alumina sulfate particles and separately converting the foamed aluminum sulfate to foamed aluminum oxide. The foamed aluminum sulfate is formed by atomizing a solution of aluminum sulfate and combining the resulting droplets with a high temperature gas and holding the mixture until the droplets dehydrate. The rate at which the particles are heated determines how quickly the water is liberated and therefore how vigorous the foaming action will be. In one embodiment the solution is atomized by passing it through an atomizing nozzle with the resulting plume of droplets and gas then being mixed with, and heated by, a high temperature and high Mach number gas. In the preferred embodiment, the aluminum sulfate solution is directly injected into the high temperature and high Mach number gas. The kinetic energy of the gas 11 is high enough to assure that the solution 12 is atomized into fine droplets and these droplets are rapidly mixed with the hot gas in the reactor 14. The particles formed thereby may be cooled by liquid spray quenching, 16. A schematic of this embodiment is shown in FIG. 3. Preferably, the high temperature and high Mach number gas has a Mach number of at least 0.2. In the examples which follow, the high velocity gas is formed by burning natural gas with either oxygen or oxygen - nitrogen mixtures. The temperature of the atomizing gas should be greater than 700° K. (427° C.).

Two important parameters of the process are the temperature of the mixture of the particles and hot gases in the reaction section of the reactor and the time during which the particles are held at that temperature. Aluminum sulfate will decompose at temperatures above 1040° K. (767° C.). The particles can be held at slightly higher temperatures if shorter residence times are used (i.e. at 1150° K. (877° C.), if maintained at this temperature for not longer than 100 milliseconds). One method of assuring that the particles do not reach temperatures in excess of 1040° K. (767° C.) for too long is to quench the mixture by spraying water or air into the hot gases. Another method is to coordinate the volume and temperature of the high Mach number gas and the volume of the feed solution so that the droplets and particles formed thereby never reach the aluminum sulfate decomposition temperature.

Once the foamed aluminum sulfate particles are formed they can be separated from the gas by any one of several methods known in the art, e.g. bag houses, cyclones, etc. The conversion of the foamed aluminum sulfate to foamed alumina is accomplished by heating in any conventional furnace, e.g. fix bed, rotary kiln or fluidized bed. The temperature and time should be high enough and long enough so that the sulfate decomposes, but should not be any higher or longer than necessary for decomposition. The aluminum oxide formed by the decomposition will sinter if it is held at the decomposition temperature and will accordingly have a lower specific surface area. Foamed aluminum oxide particles with the desired specific surface area and pore volume are formed when the aluminum sulfate is heated to 1120° K. for one hour.

In order to further illustrate the invention, the following Example is provided; it is to be understood, however, that the Example is included for illustrative purposes only and is not intended to limit the scope of the invention as set forth in the accompanying claims.

EXAMPLE

The initial foaming was accomplished in a reactor consisting of two sections. The first section was a cylindrical burner where natural gas was combined with oxygen or oxygen/nitrogen mixtures and ignited. The second section consisted of a wider refractory lined reactor section. The resulting flame had a Mach number between 0.5 and 1.0. At the end of the burner section an aqueous solution of 25 weight percent aluminum sulfate was injected from a nozzle as a coherent stream into the hot, high kinetic energy gas. The high kinetic energy assures that the solution will be atomized to fine droplets and that the droplets will mix rapidly with the hot gas. The small particle size, rapid mixing and high gas temperatures assure rapid heat transfer to the droplet.

Table 1 shows eleven different cases where the aluminum sulfate solution was injected into the hot gas. The first three columns give the temperature, mass flow rate and Mach number of the gas. In all cases the solution was injected as a coherent stream at the same rate of 12.5 g/sec. The temperature of the reactor varied between 657° K. (402° C.) and 1685° K. (1412° C.) and the residence time varied from 30 to 70 milliseconds with the shorter residence times occurring at the higher temperatures. Table 2 lists the burner temperature and the composition of the resulting particles. The temperature in the reaction section has been determined by calculating the heat released through combustion and measuring the heat loss in the reaction section; the values for heat released, heat loss and amount of material flowing through the reactor are used to calculate the reaction section temperature. Table 2 also gives data on properties of the particles after they have been heat treated in an oven for one hour at 1120° K. (847° C.).

Table 3 shows the surface area of the aluminum oxide particles converted from precursors made according to the foamed aluminum sulfate of sample 5.

TABLE I

| Sample Number | Burner Temp (°K.) | Burner Mass (gm/sec) | Burner Mach # | Solution Mass (gm/sec) | Reactor Temp (°K.) | Reactor Time (msec) |
| --- | --- | --- | --- | --- | --- | --- |
| 1 | 1019 (746° C.) | 79.6 | 0.75 | 12.49 | 657 (348° C.) | 69.7 |
| 2 | 1237 (964° C.) | 71.2 | 0.64 | 12.49 | 803 (530° C.) | 59.6 |
| 3 | 1378 (1105° C.) | 65.4 | 0.68 | 12.49 | 900 (627° C.) | 56.9 |
| 4 | 1486 (1213° C.) | 64.6 | 0.75 | 12.49 | 993 (720° C.) | 51.4 |
| 5 | 1583 (1310° C.) | 64.4 | 0.78 | 12.49 | 1107 (834° C.) | 470 |
| 6 | 1677 (1404° C.) | 64.2 | 0.76 | 12.49 | 1190 (917° C.) | 44.0 |
| 7 | 1910 (1637° C.) | 59.6 | 0.79 | 12.49 | 1326 (1053° C.) | 40.2 |
| 8 | 1927 (1654° C.) | 60.3 | 0.78 | 12.49 | 1371 (1098° C.) | 39.3 |
| 9 | 2014 (1741° C.) | 61.6 | 0.79 | 12.49 | 1461 (1188° C.) | 36.0 |
| 10 | 2117 (1884° C.) | 61.8 | 0.79 | 12.49 | 1564 (1291° C.) | 33.4 |
| 11 | 2195 (1922° C.) | 61.6 | 0.79 | 12.49 | 1685 (1412° C.) | 31.7 |

TABLE 2

FOAMED PRODUCT SURFACE AREAS

| Sample Number | Burner Temp (°K.) | Product Material* | Product Area (M²/gm) | Calcined Area M²/gm |
| --- | --- | --- | --- | --- |
| 1 | 657 (384° C.) | Sulfate | | 170 |
| 2 | 803 (530° C.) | Sulfate | | 177 |
| 3 | 900 (627° C.) | Sulfate | | 170 |
| 4 | 993 (720° C.) | Sulfate | | 165 |
| 5 | 1107 (834° C.) | Sulfate | 22 | 160 |
| 6 | 1190 (917° C.) | Sulfate | 18 | 155 |
| 7 | 1326 (1053° C.) | Oxide | 16 | 89 |
| 8 | 1371 (1098° C.) | Oxide | 23 | 80 |
| 9 | 1461 (1188° C.) | Oxide | 26 | 84 |
| 10 | 1564 (1291° C.) | Oxide | 56 | 64 |

TABLE 2-continued

FOAMED PRODUCT SURFACE AREAS

| Sample Number | Burner Temp (°K.) | Product Material* | Area (M²/gm) | Calcined Area M²/gm |
|---|---|---|---|---|
| 11 | 1685 (1412° C.) | Oxide | 39 | 48 |

*Determined by x-ray diffraction

TABLE 3

CALCINED PRODUCT SURFACE AREA VS TEMPERATURE

| Sample** Number | Calcine Temp* (°C.) | Surface Area (M²/gm) |
|---|---|---|
| 12 | 800 | 60 |
| 13 | 850 | 160 |
| 14 | 900 | 140 |
| 15 | 950 | 120 |
| 16 | 100 | 100 |
| 17 | 1070 | 75 |

*Calcined for 1 hour
**Product originally made under the conditions of sample 5.

TABLE 4

CALCINED PRODUCT SURFACE AREA VS TIME

| Sample** Number | Calcine Time* (hr) | Surface Area (M²/gm) |
|---|---|---|
| 18 | ½ | 105 |
| 13 | 1 | 160 |
| 19 | 2 | 120 |
| 20 | 4 | 120 |

*Calcined at 850° C.
**Product originally made under the conditions of sample 5.

Table 4 shows the surface area of the calcined product at constant temperature over a period of ½ to 4 hours.

All measurements of surface area were made by heat treating the samples at 400° C. for one hour and then using the single point BET method to determine surface area from nitrogen absorption at 77° K. ($-196°$ C.).

The pore volume of the foamed aluminum oxide particles made from sulfates is very large. Table 5 lists the pore volume of foamed aluminum oxide particles made from foamed alumina sulfates (samples 1, 2 and 5) and foamed aluminum oxide particles made in a one step process using an aluminum sulfate feed solution (samples 8, 9, 11). The foamed alumina particles made from foamed aluminum sulfates have a significantly higher pore volume.

Pore volume was measured by dispersing the powders in 10 times their weight of water. The dispersion was dried at 100° C. and weighed. Then the dry cake was allowed to absorb water and the pore volume was measured by the weight gained.

TABLE 5

PORE VOLUME

| Sample Number | Material | Pore Volume (ml/gm) |
|---|---|---|
| 1 | Oxide | 4.7 |
| 2 | Oxide | 5.5 |
| 5 | Oxide | 6.5 |
| 8 | Oxide | 4.0 |
| 9 | Oxide | 2.7 |
| 11 | Oxide | 1.5 |

What we claim is:

1. A method for producing alumina foam particles comprising:
   a) atomizing a solution of aluminum sulfate to form droplets thereof;
   b) heating the droplets of aluminum sulfate until the droplets of aluminum sulfate convert to foamed aluminum sulfate particles; and
   c) heating the foamed aluminum sulfate particles until the foamed aluminum sulfate particles convert to foamed alumina particles.

2. The method as recited in claim 1 wherein during said atomizing step the solution of aluminum sulfate is atomized by injecting, in a burner section of a reactor, an aluminum sulfate solution into a gas traveling through the burner section, the gas having a velocity sufficient to kinetically atomize the aluminum sulfate solution.

3. The method as recited in claim 2 wherein the gas sufficient to kinetically atomize the aluminum sulfate solution has a Mach number of at least Mach 0.2.

4. The method as recited in claim 2 wherein the gas sufficient to kinetically atomize the aluminum sulfate feed solution has a temperature of at least 700° K. (427° C.) when the aluminum sulfate solution is injected therein.

5. The method as recited in claim 1 wherein during said step of heating of the droplets of aluminum sulfate solution, the droplets of aluminum sulfate solution are heated to a temperature less than 1150° K. (877° C.).

6. The method as recited in claim 1 wherein, during said step of heating of the droplets of aluminum sulfate solution, the droplets of aluminum sulfate solution are heated for less than 100 milliseconds.

7. The method as recited in claim 1 wherein during said step of heating of the foamed aluminum sulfate particles the foamed aluminum sulfate particles are heated at a temperature between 1070° K. (797° C.) and 1340° K. (1067° C.).

8. A method for producing alumina foam particles comprising:
   injecting, in a burner section of a reactor, an aluminum sulfate solution into a gas traveling through the burner section, the gas having a velocity sufficient to kinetically atomize the aluminum sulfate solution, wherein the temperature of the gas as the aluminum sulfate solution is injected therein is at least 700° K. (427° C.);
   maintaining, in a reaction section of the reactor, the gas and the injected aluminum sulfate solution until the injected aluminum sulfate solution converts to foamed aluminum sulfate particles; and
   heating the foamed aluminum sulfate particles until the foamed aluminum sulfate particles convert to foamed alumina particles.

9. The method as recited in claim 8 wherein the temperature of at least 700° K. (427° C.) of the gas as the aluminum sulfate solution is injected therein during said injecting step and the residence time during said maintaining step of the gas and the injected aluminum sulfate solution are sufficient to prevent the foamed aluminum sulfate particles from reaching the decomposition temperature of the foamed aluminum sulfate particles during said maintaining step.

10. A method for producing alumina containing foam particles comprising:
   a) atomizing an aluminum sulfate containing solution to form droplets thereof;
   b) heating the droplets of aluminum sulfate containing solution until the droplets of aluminum sulfate containing solution convert to foamed aluminum sulfate particles; and
   c) heating the foamed aluminum sulfate particles until the foamed aluminum sulfate particles convert to foamed alumina particles.

* * * * *